United States Patent
Stroh

(10) Patent No.: US 7,171,299 B1
(45) Date of Patent: Jan. 30, 2007

(54) DRIVELINE CLUNK MANAGEMENT SYSTEM

(75) Inventor: David J. Stroh, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/209,796

(22) Filed: Aug. 23, 2005

(51) Int. Cl.
*G06F 19/00* (2006.01)
*G06F 1/00* (2006.01)

(52) U.S. Cl. ...................... 701/110; 701/111
(58) Field of Classification Search ............ 701/101, 701/110, 111, 112
See application file for complete search history.

(56) References Cited

U.S. PATENT DOCUMENTS

| | | | |
|---|---|---|---|
| 5,477,827 A | * | 12/1995 | Weisman et al. ........... 123/436 |
| 5,732,676 A | * | 3/1998 | Weisman et al. ........... 123/436 |
| 6,718,943 B1 | * | 4/2004 | De La Salle et al. ... 123/406.24 |
| 6,945,910 B1 | * | 9/2005 | Cullen et al. ............... 477/176 |
| 2002/0129788 A1 | * | 9/2002 | O'Neil et al. ............... 123/350 |
| 2006/0064232 A1 | * | 3/2006 | Ampunan et al. .......... 701/115 |

* cited by examiner

*Primary Examiner*—John T. Kwon
(74) *Attorney, Agent, or Firm*—Christopher DeVries

(57) ABSTRACT

A system for reducing clunk in a driveline of a vehicle having an engine comprises a torque-based module that generates a torque request, a filter that receives the torque request from the torque-based module and that selectively modifies the torque request to reduce a rate of change of the torque request, and an engine control module that receives the modified torque request and actuates the engine to produce the modified torque request. The filter slows torque changes to a fixed rate within a range defined by an upper limit greater than zero torque and a lower limit less than zero torque. The filter applies a low-pass filter to the torque request when the torque request is greater than a cut-off value, and coefficients of the low-pass filter are selected from a table based upon the currently selected gear in the vehicle and an output of an aggressive driving evaluator.

21 Claims, 3 Drawing Sheets

DRIVELINE CLUNK MANAGEMENT SYSTEM

FIELD OF THE INVENTION

The present invention relates to management of driveline oscillation and clunk in a self-powered vehicle.

BACKGROUND OF THE INVENTION

When a driver presses on a gas pedal in a vehicle, torque is requested from an engine through a driveline. If the driveline had previously been communicating little or no torque to a set of wheels, as when the vehicle is at rest or coasting, the driveline will be slack. This slack, or lash, is taken up rapidly when torque is applied, resulting in a collision between driveline gears and a clunk noise. The compliance of the driveline allows oscillatory behavior after the clunk, which stresses driveline components. Even when the driveline is providing positive torque, a rapid change in torque may excite the oscillatory behavior. Various methods have been employed to combat this problem of clunk and oscillation.

Referring now to FIG. 1, a block diagram of a clunk management system according to the prior art for an engine without electronic throttle control (ETC) is depicted. A pedal 102 controls an engine throttle body 104 within an engine 106. A position of the pedal 102 is communicated to a torque comparator 108 and a spark advance calculator 110. Engine sensors 112 (e.g., RPM, etc.) provide data to the torque comparator 108 and to the spark advance calculator 110. The spark advance calculator 110 provides a spark advance signal to ignition coils 114. The ignition coils 114 cause spark plugs (not shown) to fire at the specified times.

The torque comparator 108 compares the current torque being produced by the engine 106 with the requested torque according to the pedal 102. If the requested torque would cause the driveline to clunk or oscillate, the torque comparator 108 instructs the spark advance calculator 110 to increase spark retard. This deviation from optimal engine operation reduces the output torque while lash is being taken up.

Referring now to FIG. 2, a block diagram of a clunk management system according to the prior art for an engine with electronic throttle control (ETC) is presented. A pedal 120 inputs pedal position to an electronic throttle control system 122. The electronic throttle control system 122 provides a requested throttle position to a blade rate limiter 124, a torque comparator 126, and a spark advance calculator 128. Engine sensors 130 (e.g., RPM, etc.) within an engine 132 provide information to the torque comparator 126 and to the spark advance calculator 128.

The spark advance calculator 128 calculates an appropriate spark advance and communicates it to ignition coils 132. The torque comparator 126 compares the current engine torque with the requested torque from the electronic throttle control 122. If the requested torque will cause driveline clunk or oscillation, the torque comparator 126 instructs the blade rate limiter 124 to slow the opening of an engine throttle 134. In this way, the output torque of the engine 132 is reduced while driveline lash is taken up.

SUMMARY OF THE INVENTION

A system for reducing clunk in a driveline of a vehicle having an engine comprises a torque-based module that generates a torque request, a filter that receives the torque request from the torque-based module and that selectively modifies the torque request to reduce a rate of change of the torque request, and an engine control module that receives the modified torque request and actuates the engine to produce the modified torque request.

In other features, the filter slows torque increases across zero torque and torque decreases across zero torque within a range defined by an upper limit greater than zero torque and a lower limit less than zero torque. In still other features, torque changes across zero torque are slowed to a fixed rate, an aggressive driving evaluator determines how aggressively the vehicle is being driven, and the fixed rate is selected from a table based upon an output of the aggressive driving evaluator.

In other features, the filter applies a low-pass filter to the torque request when the torque request is greater than a cut-off value, and coefficients of the low-pass filter are selected from a table based upon the currently selected gear in the vehicle and the output of the aggressive driving evaluator. In still other features, the torque-based module generates the torque request based upon at least one of driver input, cruise control, traction control, and stability control.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 2:
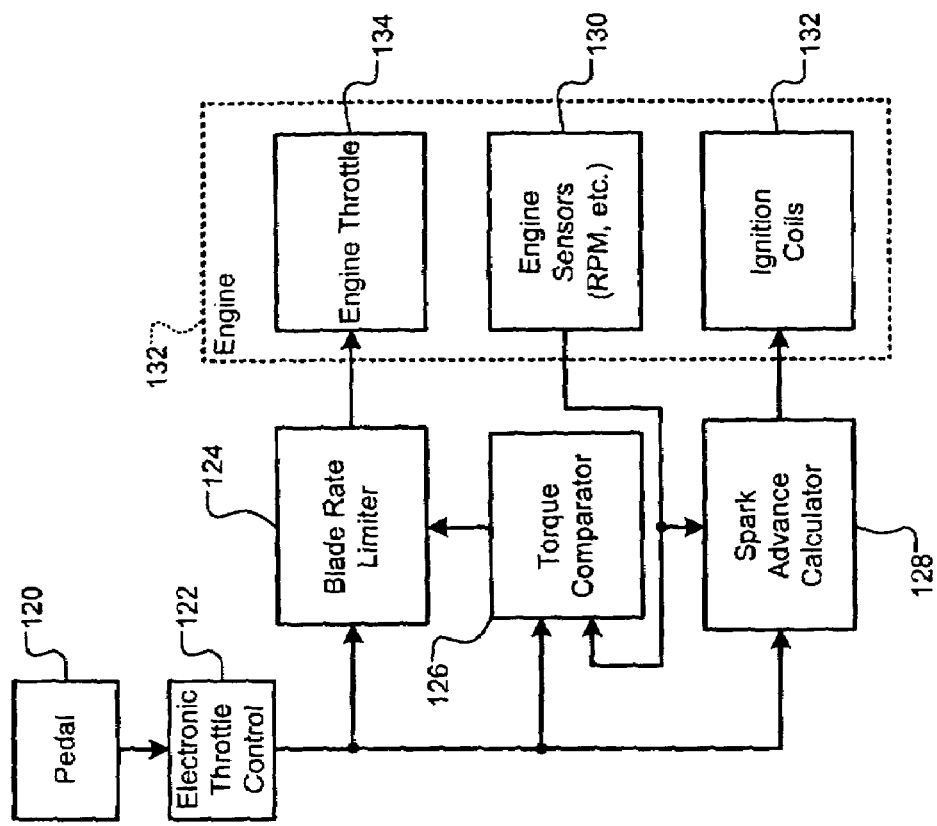
FIG. 2 is a block diagram of a clunk management system according to the prior art for an engine with ETC.
Figure 1:
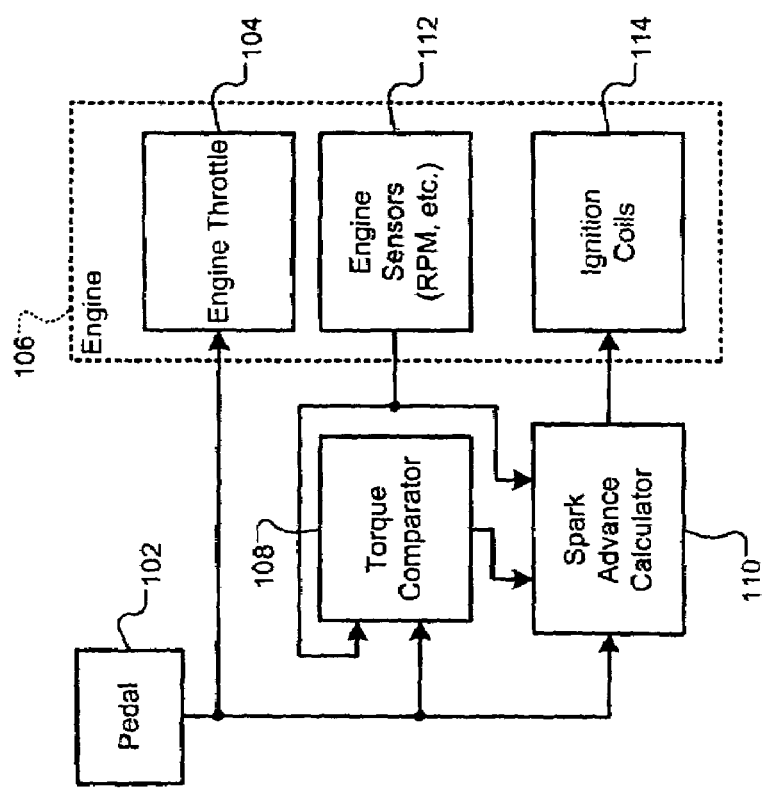
FIG. 1 is a block diagram of a clunk management system according to the prior art for an engine without electronic throttle control (ETC)

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
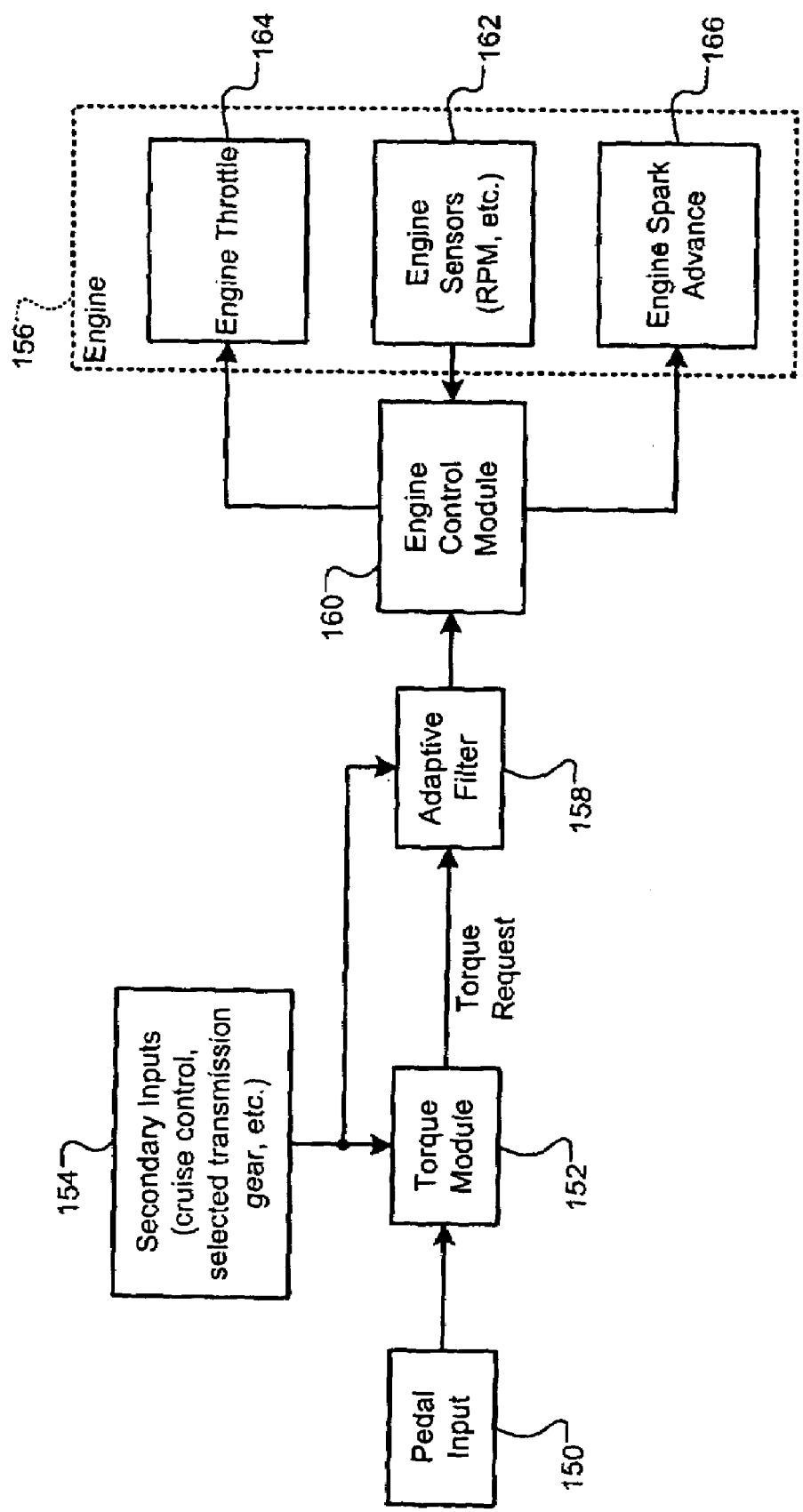
FIG. 3 is a block diagram of an exemplary clunk management system according to the principles of the present invention.

Referring now to FIG. 3, a block diagram of an exemplary clunk management system according to the principles of the present invention is presented. A driver interacts with a pedal input device 150, which provides pedal information to a torque module 152. Secondary inputs 154 (e.g., cruise control, selected transmission gear, etc.) are provided to the torque module 152. The torque module 152 determines a torque request sufficient, for example, to maintain a speed set by cruise control, or to produce acceleration indicated by the pedal input device 150. The torque module 152 may also incorporate input from traction control or body/stability control modules (not shown). This torque request is provided to an adaptive filter 158.

The adaptive filter 158 also receives the secondary inputs 154. The adaptive filter 158 limits the received torque request so that driveline clunk and oscillation is reduced or eliminated. For instance, the adaptive filter 158 may reduce the rate of change of the torque request while the torque request is crossing zero torque and/or limit abrupt changes in torque request outside of the zero crossing region.

This modified torque request is communicated to an engine control module 160, which receives information from engine sensors 162, and controls engine throttle 164 and engine spark advance 166. With the present approach, the engine control module 160 can optimize throttle position and spark advance to minimize emissions and maximize efficiency, even while limiting torque to reduce oscillation. In contrast, the prior art forces the engine into less efficient operation by independently slowing the throttle opening or retarding the spark. The present approach greatly simplifies calibration, allowing the engine to be calibrated for optimal performance while clunk management is calibrated separately.

Figure 4:
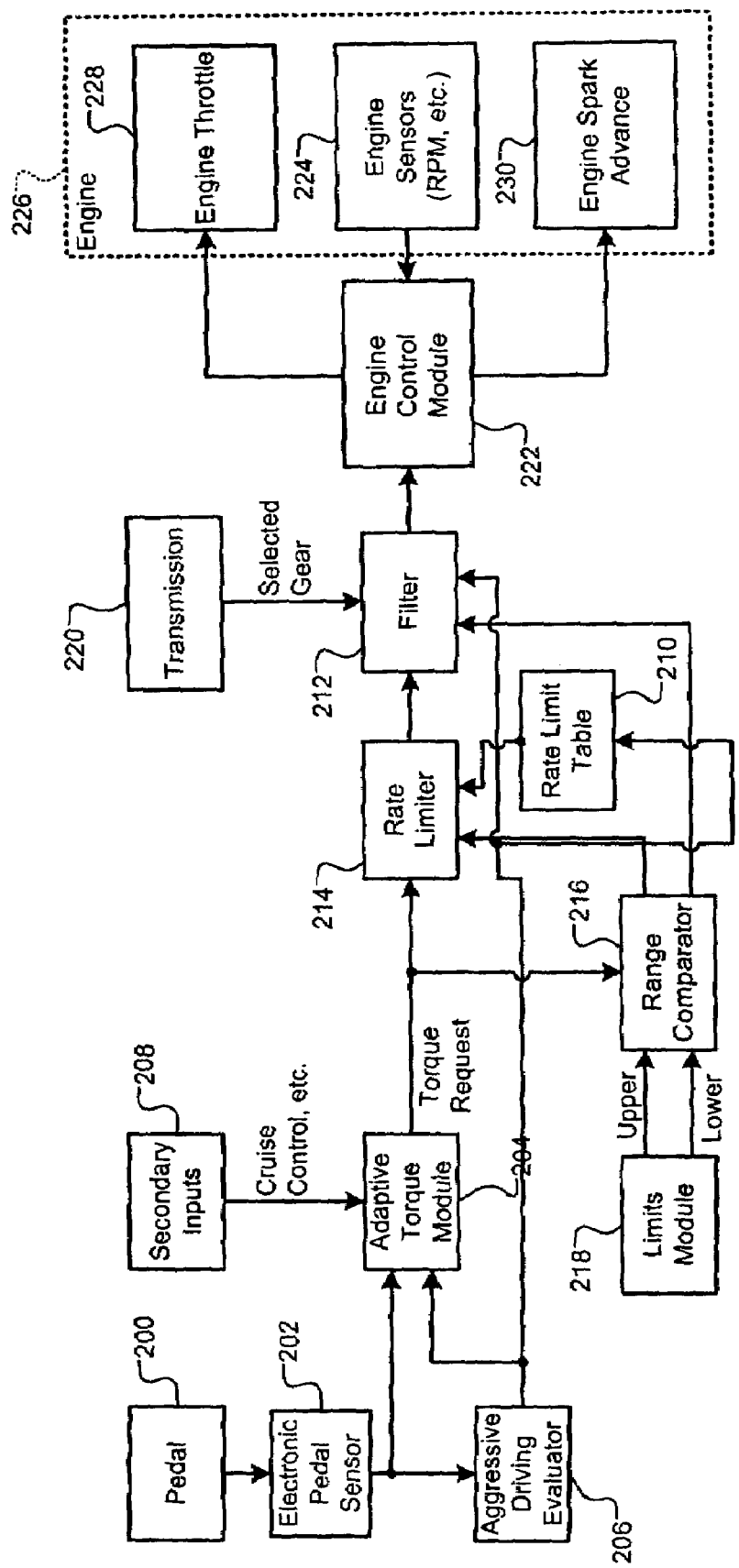
FIG. 4 is a block diagram of an exemplary implementation of a driveline clunk management system according to the principles of the present invention.

Referring now to FIG. 4, a block diagram of an exemplary implementation of a driveline clunk management system according to the principles of the present invention is depicted. A driver of a vehicle engages an accelerator pedal 200, the position of which is read by an electronic pedal sensor 202. An output of the electronic pedal sensor 202 is communicated to an adaptive torque module 204 and to an aggressive driving evaluator 206. The adaptive torque module 204 receives secondary inputs 208 (e.g., cruise control, selected transmission gear, etc.).

The aggressive driving evaluator 206 determines a signal based upon how aggressively the driver is operating the vehicle, and communicates this signal to the adaptive torque module 204, a rate limit table 210, and a filter 212. The adaptive torque module 204 determines a torque request sufficient, for example, to maintain a speed set by cruise control or to produce acceleration indicated by the accelerator pedal 200. The adaptive torque module 204 may also incorporate input from traction control and/or body/stability control modules (not shown). This torque request, which may be positive or negative, is communicated to a rate limiter 214 and to a range comparator 216.

A limits module 218 contains an upper and lower torque limit that is calibrated based upon torque tolerances and system response time. These upper and lower torque limits are communicated to the range comparator 216. If the torque request from the adaptive torque module 204 is between the upper and lower torque limits, the range comparator 216 communicates a first enable signal to the rate limiter 214. If the torque request is greater than the upper torque limit, the range comparator 216 communicates a second enable signal to the filter 212.

The rate limit table 210 selects a rate limit from a calibrated table based upon the received aggressive driving signal, and communicates this limit to the rate limiter 214. When the rate limiter 214 receives the first enable signal, it restricts the rate of change of the incoming torque request to be no greater than the limit received from the rate limit table 210. This restricted torque request is communicated to the filter 212. If the rate limiter 214 does not receive the first enable signal, it passes the torque request through to the filter 212 unmodified.

The filter 212 selects low-pass filter coefficients from a calibrated table based upon a gear selection signal received from a transmission 220 and the aggressive driving signal. When the filter 212 receives the second enable signal, it applies the selected low-pass filter to the torque request arriving from the rate limiter 214. The filtered torque request is communicated to an engine control module 222. If the second enable signal is not received, the filter 212 passes the torque request through unmodified to the engine control module 222. The engine control module 222 receives data from engine sensors 224 (e.g., RPM, etc.) within an engine 226. The engine control module 222 controls engine throttle 228 and engine spark advance 230 to maximize efficiency and minimize emissions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for reducing clunk in a driveline of a vehicle having an engine, comprising:
   a torque-based module that generates a torque request;
   a filter that receives said torque request from said torque-based module and that selectively modifies said torque request to reduce a rate of change of said torque request; and
   an engine control module that receives said modified torque request and actuates the engine to produce said modified torque request.

2. The system of claim 1 wherein said filter slows torque request changes across zero torque.

3. The system of claim 2 wherein said filter slows torque request increases across zero torque and torque request decreases across zero torque.

4. The system of claim 1 wherein said filter slows torque request changes within a range surrounding zero torque.

5. The system of claim 4 wherein said range is determined by an upper limit greater than zero torque and a lower limit less than zero torque.

6. The system of claim 2 wherein said torque request changes across zero torque are limited to a fixed rate.

7. The system of claim 6 further comprising an aggressive driving evaluator that determines how aggressively the vehicle is being driven, wherein said fixed rate is determined based upon an output of said aggressive driving evaluator.

8. The system of claim 7 wherein said fixed rate is selected from a table based upon said output of said aggressive driving evaluator.

9. The system of claim 1 wherein said filter selectively applies a low-pass filter to said torque request.

10. The system of claim 9 further comprising an aggressive driving evaluator that determines how aggressively the vehicle is being driven, wherein coefficients of said low-pass filter are determined based upon a currently selected gear in the vehicle and an output of said aggressive driving evaluator.

11. The system of claim 10 wherein said coefficients of said low-pass filter are selected from a table based upon said currently selected gear in the vehicle and said output of said aggressive driving evaluator.

12. The system of claim 9 wherein said filter applies said low-pass filter to said torque request when said torque request is greater than a cut-off value.

13. The system of claim 1 wherein said torque-based module generates said torque request based upon at least one of driver input, cruise control, traction control, and stability control.

14. A system for reducing clunk in a driveline of a vehicle having an engine, comprising:
   a torque-based module that generates a torque request;
   an adaptive filter that receives said torque request from said torque-based module and that modifies said torque request by reducing a rate of change of said torque request across zero torque, and selectively applying a low-pass filter to said torque request; and
   an engine control module that receives said modified torque request and actuates the engine to produce said modified torque request.

15. The system of claim 14 wherein said adaptive filter slows torque request changes surrounding zero torque within a range determined by an upper limit greater than zero torque and a lower limit less than zero torque.

16. The system of claim 14 wherein said rate of change for said torque request changes across zero torque is limited to a fixed rate.

17. The system of claim 16 further comprising an aggressive driving evaluator that determines how aggressively the vehicle is being driven, wherein said fixed rate is determined based upon an output of said aggressive driving evaluator.

18. The system of claim 17 wherein said fixed rate is selected from a table based upon said output of said aggressive driving evaluator.

19. The system of claim 14 further comprising an aggressive driving evaluator that determines how aggressively the vehicle is being driven, wherein coefficients of said low-pass filter are selected from a table based upon a currently selected gear in the vehicle and an output of said aggressive driving evaluator.

20. The system of claim 15 wherein said adaptive filter applies said low-pass filter to said torque request when said torque request is greater than a cut-off value.

21. The system of claim 20 wherein said cut-off value is equal to said upper limit.

* * * * *